(12) United States Patent
Portman et al.

(10) Patent No.: US 9,826,849 B2
(45) Date of Patent: Nov. 28, 2017

(54) UNIVERSAL LID SYSTEM AND METHODS

(75) Inventors: Jill Portman, San Anselmo, CA (US);
Gary Shinner, San Anselmo, CA (US)

(73) Assignee: Mighty Leaf Tea, San Rafael, CA (US)

( * ) Notice: Subject to any disclaimer, the term of this patent is extended or adjusted under 35 U.S.C. 154(b) by 636 days.

(21) Appl. No.: 13/292,811

(22) Filed: Nov. 9, 2011

(65) Prior Publication Data
US 2012/0118887 A1 May 17, 2012

Related U.S. Application Data

(60) Provisional application No. 61/411,748, filed on Nov. 9, 2010.

(51) Int. Cl.
*A47G 19/14* (2006.01)
*A47J 31/20* (2006.01)

(52) U.S. Cl.
CPC .......... *A47G 19/14* (2013.01); *A47G 19/145* (2013.01); *A47J 31/20* (2013.01)

(58) Field of Classification Search
CPC ........ A47G 19/145; A47G 19/14; A47J 31/20
USPC .............. 220/212, 719; 426/77, 435; 99/322
See application file for complete search history.

(56) References Cited

U.S. PATENT DOCUMENTS

| | | |
|---|---|---|
| 1,123,467 A | 1/1915 | Bauer |
| 1,572,082 A | 2/1926 | Ramge |
| 1,785,878 A * | 12/1930 | Schachter ...................... 99/295 |
| 2,004,883 A | 6/1935 | Wolcott |
| 2,099,996 A | 11/1937 | Beling |
| 2,187,029 A | 1/1940 | Hevers |
| 2,284,087 A | 5/1942 | Ferguson |
| 2,793,954 A | 5/1957 | Nelson et al. |
| 3,280,721 A | 10/1966 | Walker |
| 3,517,604 A | 6/1970 | Coors |
| 3,861,284 A * | 1/1975 | Costello ........................ 99/321 |
| 4,602,557 A | 7/1986 | Yip |
| 4,739,696 A | 4/1988 | Sheen |
| 5,318,791 A | 6/1994 | Millman et al. |
| 5,620,724 A * | 4/1997 | Adler .............................. 426/77 |
| 5,626,895 A | 5/1997 | Gotz |
| 5,657,898 A * | 8/1997 | Portman et al. .............. 220/712 |
| 5,924,354 A | 7/1999 | Court et al. |
| 6,314,866 B1 * | 11/2001 | Melton .......................... 99/322 |

(Continued)

FOREIGN PATENT DOCUMENTS

DE   4315953 A1   12/1994
EP   1690805 A1   8/2006

(Continued)

OTHER PUBLICATIONS

Internet web site http://images.replacements.com—Teapot lid with a hole in the lid Link: http://images.replacements.com/images/images5/china/Hhall_orange_poppy_boston_shape_tea_pot_lid_lid_only_P0000038907S0013T2.jpg.

(Continued)

*Primary Examiner* — James N Smalley
(74) *Attorney, Agent, or Firm* — Valauskas Corder LLC

(57) ABSTRACT

A universal lid system and methods for use with any of a selection of teapots for quick and sanitary beverage preparation. More specifically, the present invention is directed to a system and methods including a lid sized and shaped to facilitate the storage of a retention element such as a tea bag. The retention element may be held out of contact with the beverage by a retention element stabilizing component.

19 Claims, 11 Drawing Sheets

(56) References Cited

U.S. PATENT DOCUMENTS

| | | | |
|---|---|---|---|
| 6,372,270 | B1 | 4/2002 | Denny |
| 7,140,510 | B2 | 11/2006 | Portman et al. |
| 8,181,817 | B2 | 5/2012 | Portman et al. |
| 8,651,316 | B2 * | 2/2014 | Portman et al. ............... 220/712 |
| 8,662,339 | B2 * | 3/2014 | Sprunger ...................... 220/521 |
| 2004/0217119 | A1 * | 11/2004 | Portman et al. ............... 220/712 |
| 2004/0232154 | A1 * | 11/2004 | Smith ................. A47G 19/2211 220/713 |
| 2006/0226147 | A1 * | 10/2006 | Phillips ................ A47G 21/106 220/254.2 |
| 2006/0273093 | A1 * | 12/2006 | Portman et al. ............... 220/712 |
| 2009/0246324 | A1 | 10/2009 | Sluzas |
| 2013/0256307 | A1 * | 10/2013 | Hewitt .......................... 220/212 |

FOREIGN PATENT DOCUMENTS

| | | |
|---|---|---|
| JP | 2001037611 | 2/2001 |
| JP | 2001309856 | 11/2001 |
| JP | 2005013667 | 1/2005 |
| JP | 2006238906 | 9/2006 |
| JP | 2008093368 | 4/2008 |
| WO | 2004026722 A1 | 4/2004 |
| WO | 2005014425 A1 | 2/2005 |
| WO | 2006126832 A1 | 11/2006 |

OTHER PUBLICATIONS

Internet web site—www.alaskaherbtea.com—Teapot with slot in upper portion of teapot for a teabag Link: http://www.alakaherbtea.com/images/teapots/teabag-teapot-white.jpg.

Internet web site http://authori-tea.com—Mighty Leaf tea mug with a slotted lid for a teabag to pass through Link: http://authori-tea.com/images/mightyleaf/tea_top_brew_mug.jpg Internet web site www.garraways.co.uk—Cup lid with a slot Link: http//www.garraways.co.uk/images/www.garraways.co.uk/thumb/1048158-oz-hot-paper-cup-travel-lid-100-pk.jpg.

* cited by examiner

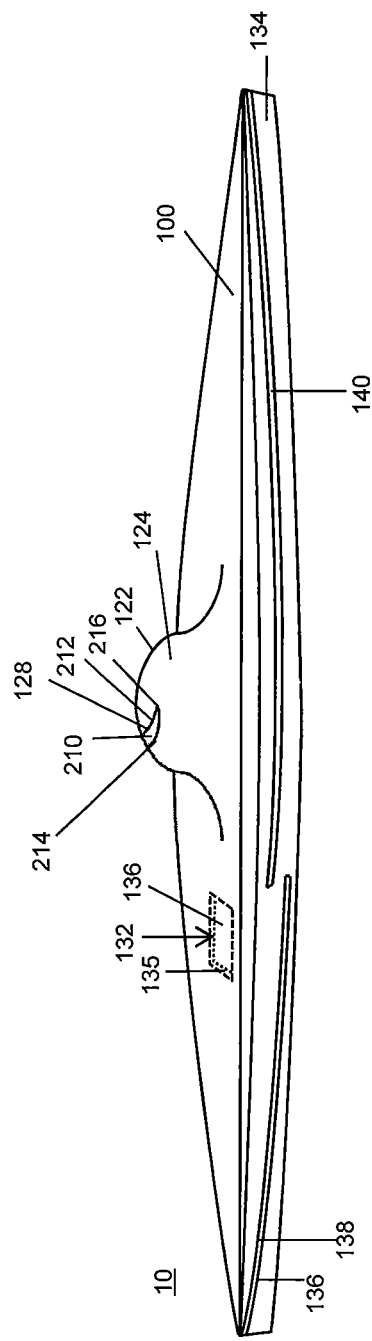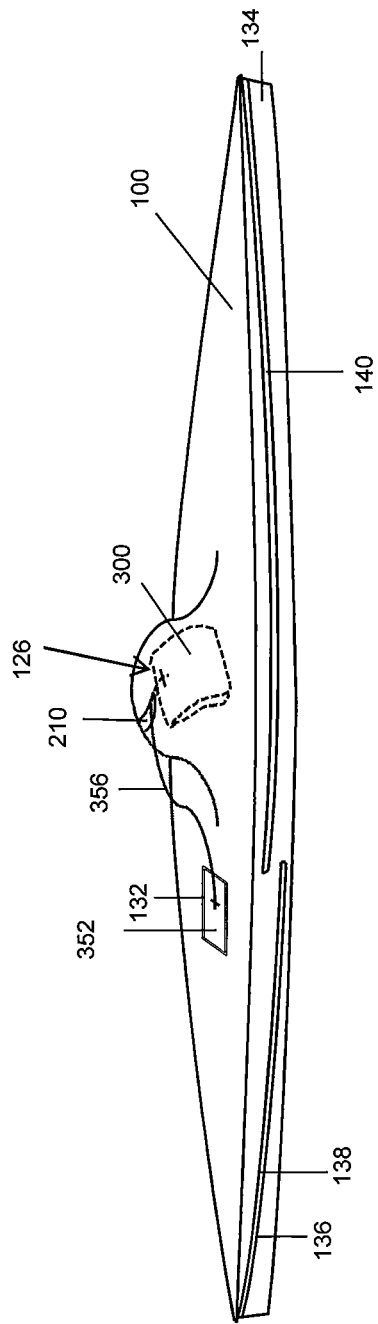

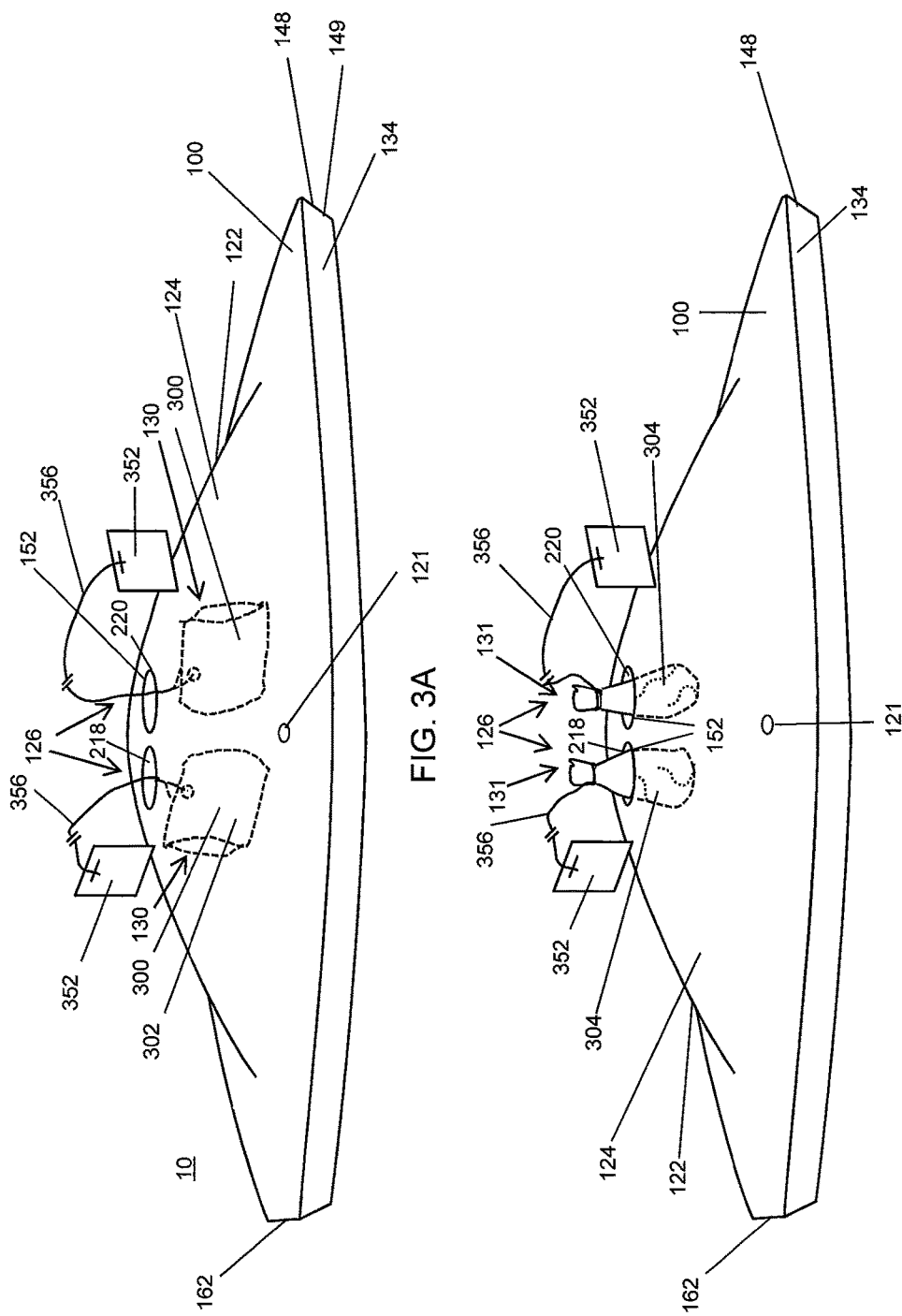

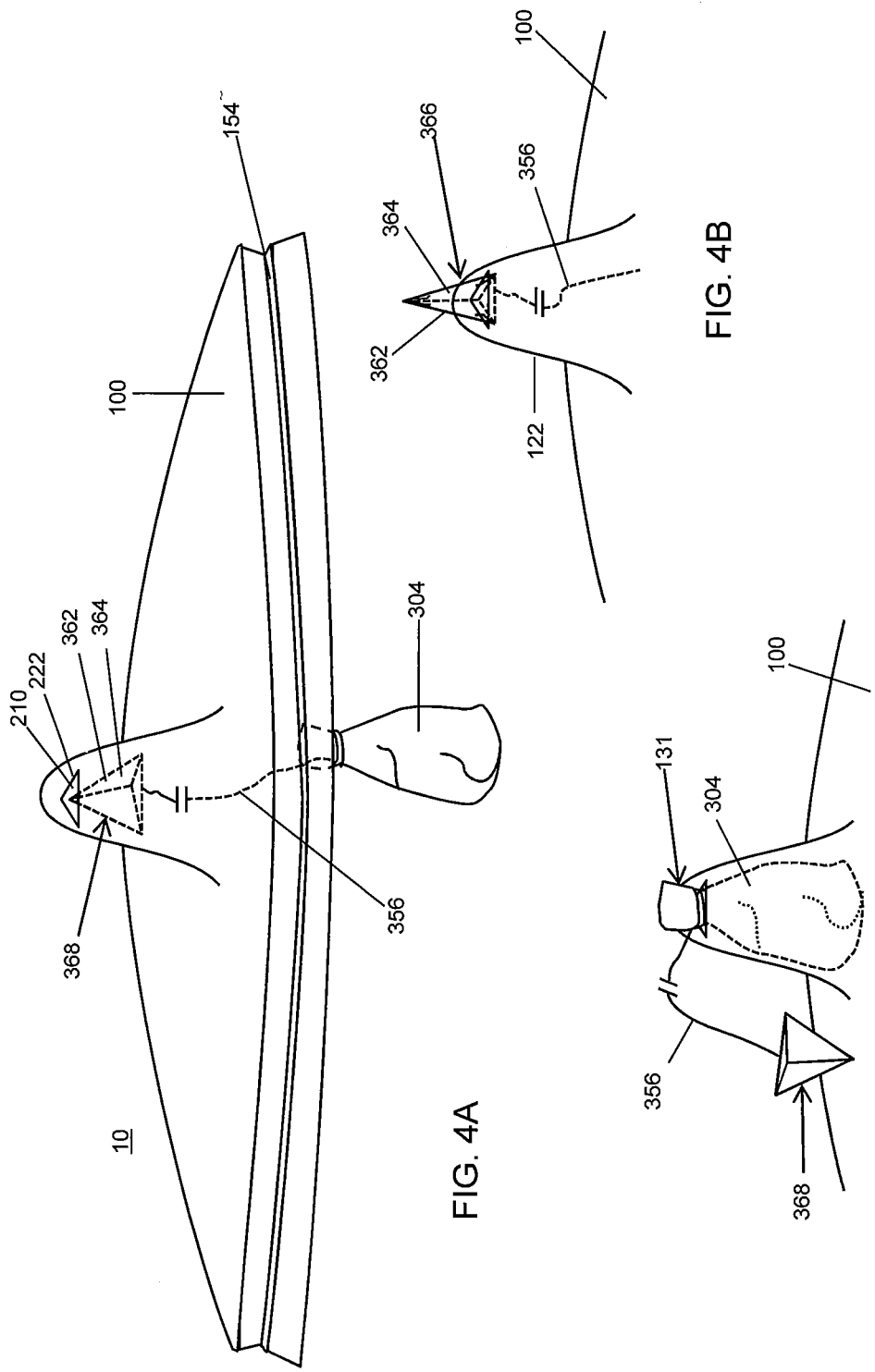

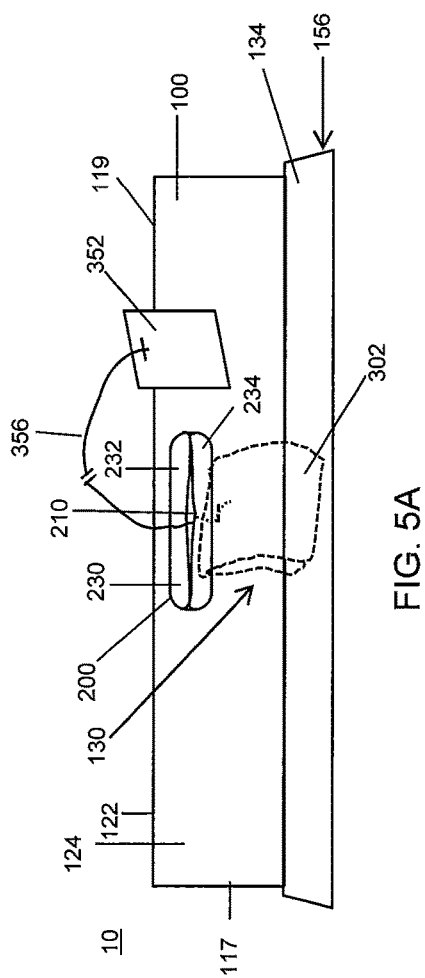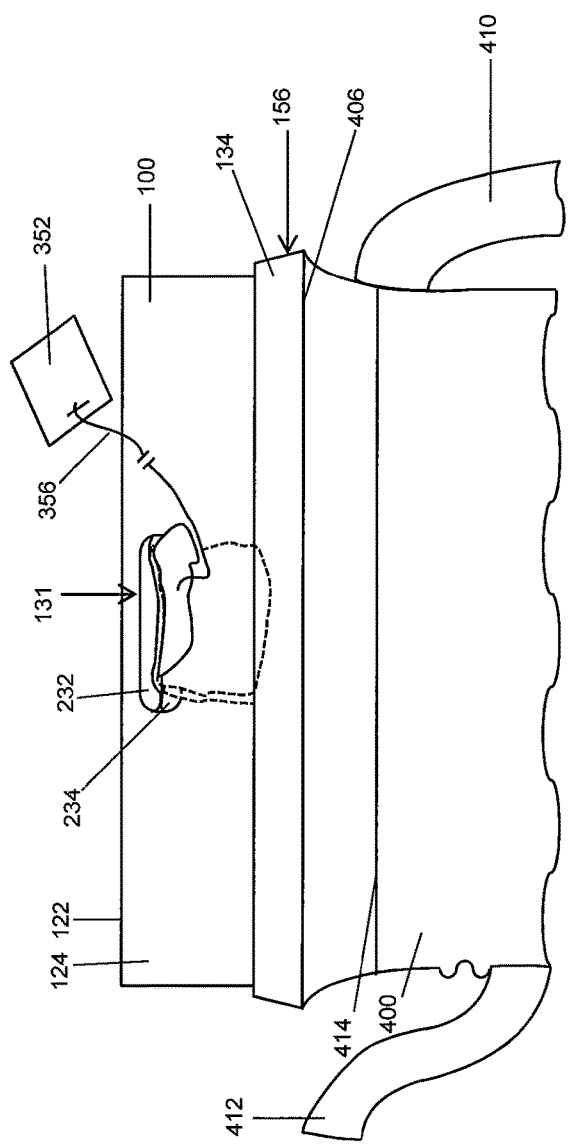

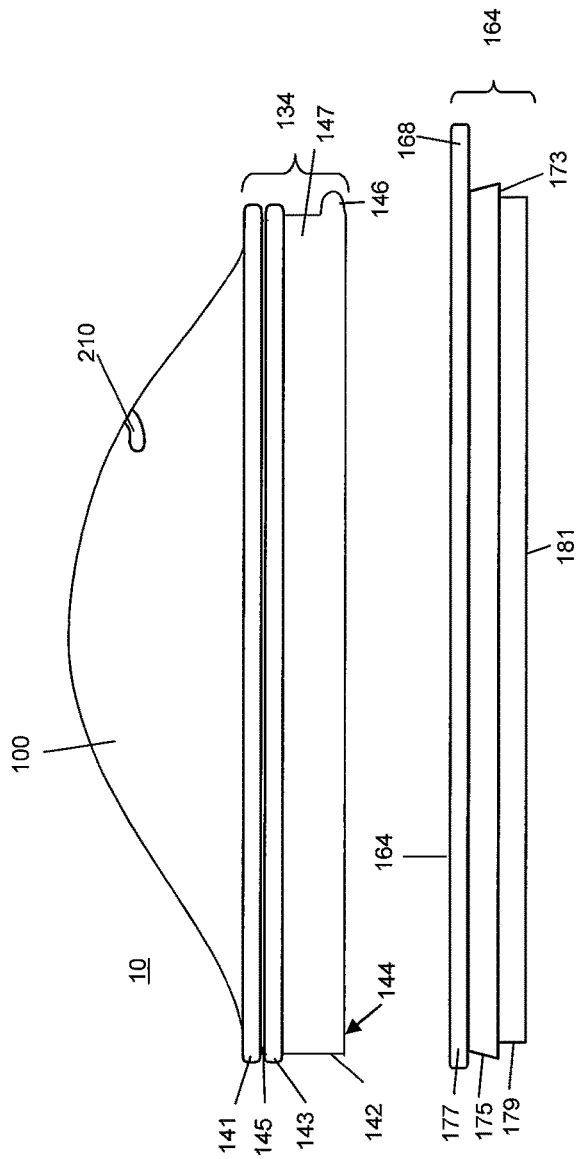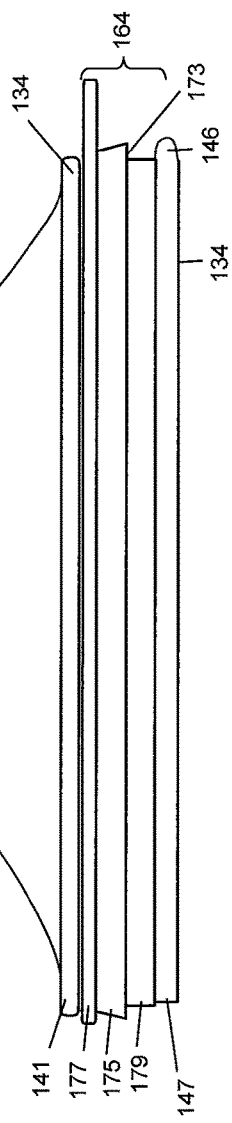
FIG. 8A
FIG. 8B

UNIVERSAL LID SYSTEM AND METHODS

This application claims the benefit of U.S. Provisional Application No. 61/411,748 filed Nov. 9, 2010.

FIELD OF THE INVENTION

The invention relates generally to a system and methods by which a beverage or other liquid may be prepared and dispensed quickly and sanitarily. More particularly, the invention relates to a universal lid system and methods that are designed to facilitate the preparation of a beverage using retention elements such as tea bags.

BACKGROUND OF THE INVENTION

Many beverages are prepared by allowing a composition to come in contact with a liquid for a sufficiently long period of time so that the characteristics such as flavoring, sweetening, and/or coloring components from the composition go into solution. For example, certain types of tea are prepared by placing the leaves or other portions of the plant *Camillia sinensis* in water for a sufficiently long period of time so that the desirable soluble components from the plant material enter the liquid through the process called infusion. Other types of "tea"—also known as herbal tea, tisane, or ptisan—are made by using portions of plants—such as fresh or dried flowers, fruit, twigs, seeds, or roots—other than that from the *Camillia sinensis* bush. The beverage coffee is made by allowing dried and ground coffee beans—that is, the seeds of the *Coffea arabica* or *Coffea canephora* var. *robusta* plant or another species of the genus *Coffea*—to come into contact with a liquid. For purposes of this application, the many types of beverages that can be made from plant material—regardless of the source of the plant material—will be generically termed "tea" and the plant material—regardless the type or source of the material—will be generically termed "leaves". Tea is typically prepared using a liquid such as water, although other starting substances that are used in combination with the tea (collectively termed "starting substance") are contemplated. For purposes of this application, the term "water" will mean any starting substance.

Historically, water was combined with the leaves from which the tea was to be made—such as putting the leaves into the water or by pouring the water onto the leaves. The water was then decanted and/or the leaves and water were separated by straining the leaves from the water to produce a beverage for service. The vessel or container—within which the leaves were placed and the leaves and water were mixed to produce tea for service—is commonly known as a "teapot". For purposes of this application, the term "teapot" will mean any size, shape, or type of container in which a beverage of any type or source may be prepared and/or served.

To facilitate the separation of the leaves and the water, a variety of components and devices were developed. These devices and components will be generally identified in this application as a "separator". One type of separator is a device that allowed the leaves to be strained from the water. In some cases, such "strainers" were used with teapots or added to teapots. Strainers added to teapots included narrowed areas of the spouts of the teapots that prevented the leaves from being discharged from the teapot when the beverage was served. Strainers included also filtering structures positioned near the teapot spout area that were intended to catch the leaves but allow the beverage to be poured.

Other devices that facilitated the straining of leaves from water were not fixed to the teapot. With time, a wide variety of separators were developed that could retain leaves yet were sufficiently porous so that the water could easily flow through the separator thereby allowing the soluble flavoring and coloring components from the leaves to go into the solution and a tea beverage to be prepared. One group of such devices is a basket-like structure—known by many terms including "tea strainer"—sized and shaped for the positioning of the leaves over the opening or mouth of a container. Water is poured over the leaves, and the resultant beverage drips or cascades into the container. For consumption of the beverage, the tea strainer—within which the wetted leaves are retained—may be easily removed. A personal sized container for which tea strainers were developed is known as a "teacup". Tea strainers that are sized and shaped to be positioned with the area of a teapot near its top are often termed "brewing baskets" or "infusing baskets".

Another type of device that facilitated the separation of the leaves from the water is generically termed a "tea infuser". Tea infusers are known by many different names such "teaball", "tea egg", or "tea maker". A tea infuser includes a perforated component that is sized and shaped to hold leaves and to be positionable in a cup, teapot, or other container, so that water can come into contact with the leaves through the perforations and can be easily extricated from the cup or pot after the beverage has been prepared. To allow the perforated component of the infuser in which the leaves are retained to be easily removed from the container, a chain, rod, or even a handle is attached to the perforated component.

An additional type of device that separates the leaves from the water is a tea bag. A tea bag largely performs the same function as a tea infuser. A tea bag is a separator made from thin material that is sufficiently inexpensive so that the bag can be discarded after a single or a limited number of uses. Such thin materials from which tea bags are made include paper, silk, muslin, and nylon. The thin material may be shaped to define a wide variety of overall bag shapes—such as square, rectangular, circular, and pyramidal—but in all cases specifically to define an inner bag volume for enclosure of the leaves. The thin material from which the bags are made has sufficient porosity so that water can flow readily in and out of the inner bag volume. For purposes of this application, tea strainer, brewing basket, infusing baskets, tea infuser, or tea bag will be termed "removable separators". For purposes of this application, the element of a removable separator in which the leaves are retained will be termed "retention element" for purposes of this application.

Certain retention elements are attached to a component that permits it to be positioned into water stored in a teapot and moved about and removed from the teapot—so that a person can have limited or no contact with the water during the beverage preparation process. Such a component will be termed "manipulation component" for purposes of this application. One example of a "manipulation component" is the string/tag arrangement of a tea bag. Other examples of a manipulation component are a chain, rod, or handle of tea infusers.

In a manipulation component including a string/tag arrangement, a string typically is attached at one end to the tea bag and a tag is attached at the opposite end of the string. The tag permits easy and sanitary positioning of the bag in the water from which the tea will be made and removal when the preparation process has been completed. The tag is typically sized and shaped so that it can easily be grasped between the thumb and forefinger of the consumer. Such size, however, allows the tag to also carry information identifying, for example, the type of tea leaves within the bag and one or more trademarks or images or other information identifying the source of the bag.

Other retention elements may be used to prepare a beverage and are not attached to a manipulation component. A user may remove the retention element from the beverage, for example, by using their fingers to pull it out or using a utensil such as a spoon to remove the retention element from the beverage.

Removable separators permit consumers to control the steeping process. Once a consumer has determined that a beverage of the proper flavor and strength has been prepared, the consumer can remove the retention element or entire removable separator from the beverage, thereby preventing the beverage from becoming overly strong in taste and possibly preventing the more acidic components of the leaves from becoming solubilized. A serious drawback to the use of removable separators, however, is that once they are removed they are often dripping wet, or at the least, moist. This condition in most cases prevents the infuser or bag from being placed on a surface that will be affected by such moisture. For this reason, a receptacle of some sort—such as a dish or tray or even sink—must be immediately available to receive the dripping infuser or wet tea bag. The need to find a receptacle for the dripping infuser or wet tea bag has additionally limited the conditions in which tea can be prepared and served.

Lids designed to facilitate the preparation and service of tea in a wide variety of conditions are known. Some other lids may be made from thicker material and are intended to simply slow down the rate at which the tea within the container covered by the lid reaches an ambient temperature—that is, the temperature outside the container. Other lids are thin components intended primarily to prevent the beverage from splashing or flowing out of the container. Some other lids are more complex designs that facilitate the preparation of tea with a tea bag and allow the tea to be consumed through the lid. These lids, for example, allow the tea bag to be pulled by the string to an elevated position at or in the lid and releasably held there so that the tea can be consumed without separation of the tea bag from the lid while still in positioned on the beverage container. Such complex arrangements include a drinking aperture through which the beverage can be consumed.

Teapots are intended for the preparation of a volume of beverage, typically more than a single cup and often for more than one consumer. The lids for teapots are intended to help slow the process by which the beverage within the teapot reaches ambient temperature. For this reason, teapot lids are not made from the thin inexpensive material suitable for one time use, then easy disposal—such as the lids used with "take away" cups—but more substantial material suitable for the task of reusing the lid and teapot and retaining the temperatures developed within the vessel portion of the teapot. For this reason, lids for teapots include no opening or, at the most, a single aperture—"pin" size in dimension—through which air may be drawn to prevent "vacuum" like conditions from being developed within the teapot as the beverage is being served from it. Overall, teapot lids do not include any features by which a removable separator can be moved from a steeping position to a position elevated relative to the beverage so that the leaves are no longer steeping yet the bag is stored for any length of time so no additional receptacle for the wet infuser or bag is necessary. A teapot lid with features by which a removable separator can be moved from a steeping position to a position elevated relative to the beverage would permit the wider usage of teapots and therefore the additional receptacle for the wet infuser/bag would be obviated.

A demand therefore exists for a lid that facilitates the preparation of a beverage from a retention element and permits the retention element to be moved to a position separated from contact with the beverage but releasably held by the lid to permit service of the beverage. The present invention satisfies the demand.

SUMMARY OF THE INVENTION

For convenience of description, terms such as "above", "below", "upper", "lower", "outer", "inner", "horizontal", and "vertical" are used to refer to the system and the components of the system in an orientation illustrated in the accompanying drawings. However, it will be understood that the embodiments of the invention described in this application advantageously can be used in a variety of orientations.

The present invention includes a universal lid system and methods for using the same with a teapot to prepare a beverage using leaves retained in a retention element. As described above, after the beverage has reached a desired state, a user typically wishes to remove the retention element from the beverage. A universal lid system advantageously includes a retention element stabilizing lid wall configured to receive and stabilize a retention element in a position not in contact with the beverage. Embodiments of a retention element stabilizing lid wall include a lid wall having a retention element stabilizing component.

Embodiments of a lid wall are sized and shaped to meet with or connect to a teapot, or more specifically, a rim of a teapot. A rim of a teapot defines a teapot opening through which the inside of the teapot and any water stored within may be accessed. A lid wall may be positioned relative to the teapot rim such that the teapot opening is covered or partially covered—a position of the lid wall termed a "closed position" for purposes of this application. Embodiments of a lid wall may be sized and shaped to meet with or connect to a teapot rim of various sizes and shapes. A lid wall generally may include an upper lid wall, a lower lid wall, and a side lid wall. A lid perimeter is the outermost border of the lid wall.

A retention element stabilizing component may be configured to permit stabilization of the retention element such that the retention element may be positioned to not have contact with the beverage but releasably held within the lid wall to permit service of the beverage while the lid wall remains in a closed position. Such a retention element stabilizing component obviates the need to remove the retention element from the teapot or lid and find an additional receptacle for the wet infuser/bag. In certain embodiments, a retention element stabilizing component is configured to stabilize the retention element relative to the lid wall such that the user may remove the lid wall and stabilized retainer element from the teapot. Embodiments of retention element stabilizing component may include, for example, structural components of the lid wall such as wall surfaces or an opening in the lid wall, or a combined arrangement of surfaces and opening in the lid wall.

In embodiments of a retention element stabilizing component including, a structural component typically is formed from various wall surfaces. Such wall surfaces may include generally horizontal surfaces, generally vertical surfaces, generally linear surfaces, generally curved surfaces, or generally sloped surfaces. A generally horizontal surface in a lid wall is approximately 180 degrees or parallel relative to a flat plane on which lid wall may be positioned. A generally vertical surface in a lid wall is approximately 90 degrees or perpendicular relative to a flat plane on which a lid wall may be positioned. A generally linear surface in a lid wall is a substantially flat surface. A generally curved surface in a lid wall is any non-linear surface including, for example, a gently curved surface, sharply curved surface, convex curved surface, concave curved surface. A sloped surface in a lid wall includes a gradient relative to horizontal. Embodiments of a lid wall may include one or more combination surfaces. For purposes of this application, a "combination surface" may be a generally horizontal linear surface, a generally vertical linear surface, a generally horizontal curved surface, a generally vertical curved surface, a generally sloped linear surface, or a generally sloped curved surface.

In certain embodiments of a retention element stabilizing lid wall, the wall surfaces may be configured to form an elevated storage element in the lid wall in which a retention element may be stored for any length of time after removal from beverage in a teapot. An elevated storage element may be formed from one or more sloped linear surfaces, one or more sloped curved surfaces, two generally vertical surfaces and a horizontal surface, or any other arrangement of surfaces or combination surfaces that form a storage space sized and shaped to store and hold a retention element. The elevated storage element may be generally elevated relative to the lid perimeter, or, in certain embodiments, the elevated storage element may be elevated relative to a teapot fill line—that is, the level to which the beverage is typically filled in the teapot—when the lid wall is in a closed position.

An elevated storage element may be sized and shaped to permit storage of one or more retentions element or one or more manipulation elements. Embodiments of elevated storage elements may be sized and shaped such that the wall surfaces tightly enclose the entirety of a retention element or a portion of a retention element. Embodiments of an elevated storage element may be sized and shaped to loosely enclose the entirety of a retention element or a portion of a retention element. Embodiments of an elevated storage element may be sized and shaped to stabilize a retention element during pouring while a lid wall is in a closed position. In such embodiments, a wall surface may block the forward movement of the retention element while the teapot and corresponding lid are in the pouring orientation.

An elevated storage element also may facilitate the expulsion of liquid from the retention element through urging a retention element against a surface of the lid wall.

In certain embodiments of a retention element stabilizing component, the structural components may retain a retention element above a beverage in a number of additional configurations. For example, structural components may include a support member such as a structure positionable between the lid wall and the teapot rim and configured to support a retention element. Structural components also may include a receptacle sized and shaped to receive the manipulation component or some portion of the manipulation component such that the manipulation component positioned in a receptacle assists in holding the retention element above the beverage.

In certain embodiments, a retention element stabilizing component includes an opening in a lid wall such as a wall outlet. A wall outlet includes an outlet border that defines an outlet space. An outlet border may include various borders having particular shapes such as an arced border, curved border, or a linear border. In certain embodiments, a wall outlet may be configured to receive and hold at least a portion of a retention element. The outlet borders hold a retention element by tension or pressure on the retention element. Outlet borders may include tension components, outlet flank components, or anything else to be configured to receive and hold the retention element in an elevated position. A retention element may be pulled partially through the wall outlet such that some of the leaves in the retention element are positioned above the upper lid wall.

In certain embodiments, a wall outlet may be configured to facilitate positioning a retention element. Such positioning may include positioning the retention element in water within a teapot on which the lid wall is positioned, may include removing the retention element from water within a teapot on which the lid wall is positioned, may include positioning the retention element in storage space defined by an elevated storage element, may include positioning the retention element in an outlet space defined by outlet borders, or may include positioning the retention element in another embodiment of a retention element stabilizing component.

In certain embodiments, when a lid wall is in a closed position and forms a generally continuous surface with the teapot, the outlet space may be the only opening through which the retention element may be lowered into the teapot without removing the lid wall. In such embodiments, a manipulation component may remain outside of the teapot/lid wall arrangement such that the manipulation element remains accessible to a user.

In certain embodiments, a wall outlet is configured to be used with a retention element having a manipulation component such as a string/tag arrangement in which the first end of the string may be connected to the tag and the second end of the string may be attached to the retention element. In such embodiments, while the lid wall is not in a closed position, a user may pass the tag through the outlet space of a wall outlet sized and shaped for the same purpose. Then, the lid wall may be positioned in the closed position. In the closed position, the retention element may be positioned generally below the lid wall, which permits easy insertion into the water held within the teapot, and the tag may be positioned generally above the lid wall, which permits easy access to the tag to pull the tag/string arrangement up and remove the retention element from the tea.

Certain embodiments of the wall outlet may be sized, shaped, or positioned to reduce the ease with which a tag may pass back through the wall outlet after having passed through in one direction. For example, a non-linear shaped outlet space may reduce the ease with which a linear tag may pass back through the outlet space. In another example, any outlet space sized smaller than a tag with which the system will be used will likely reduce the ease with which a tag will pass back through. Yet, a tag may be bent, flexed, collapsed, folded, or otherwise achieve a reduced profile to fit through the outlet space. After the tag passes through the outlet space, the tag may expand and achieve an expanded profile such that the tag does not easily pass back through the outlet space. Such an expanded profile may include the tag becoming, for example, un-bent, unflexed, uncollapsed, or unfolded.

In certain embodiments, a retention element stabilizing component includes wall surfaces and openings configured in combination to releasably hold a retention element out of contact with a beverage. In such embodiments, an outlet wall may be sized and shaped to permit positioning the retention element in an elevated position. Such embodiments may include a lid wall having a wall outlet and an elevated storage element. In such embodiments, a tag thread through the outlet space may be used to facilitate positioning the retainer element within the storage space of the elevated storage element.

Embodiments of the lid wall also may include a wall outlet configured or positioned to reduce the rate at which the temperature within the teapot on which the lid wall is positioned reaches an ambient temperature. In such embodiments, a wall outlet may include an outlet flank component. An outlet flank component may be configured to permit a portion of or all of a manipulation component or a portion or all of a retention element to pass through the outlet space, while minimizing the amount of ambient air exchanged between through the outlet space. Certain embodiments of outlet flanks also may be configured to receive a retention element and hold the retention element in an elevated position. An outlet flank component may be made from a flexible material, for example, rubber, synthetic resin, plastic, latex, cotton, polyester, spandex, or any combination and may be positioned along the outlet borders.

Embodiments of a universal lid also may include a closure component. A closure component may be configured to permit the lid wall to meet with or releasably connect to a teapot, or more specifically, to a teapot rim. Embodiments of a closure component may be connected to a lower lid wall, upper lid wall, or a side lid wall. In certain embodiments, a closure component may be connected to both a lower lid wall and an upper lid wall such that the lid wall may achieve a closed position in which either side wall is in contact with the teapot rim, and accordingly, is reversible. Certain lid wall embodiments include a closure component complementary to a teapot closure component such as threading and a thread-path, a male snap component and a female snap component, an adhesive, a locking mechanism, hinge, or any other configuration resulting in a releasable connecting the lid wall to the teapot rim. A closure component also may be configured to merely meet with a teapot closure component such that the components are not fastened together.

Embodiments of a lid wall may be configured for use with certain forms of tea bags. Tea bag designs may include a packet, a holder, or other design, each of which may be used with a tag/string arrangement or other manipulation component. Certain embodiments of a lid wall may include a receptacle configured to receive a tag or other manipulation component. One embodiment of a receptacle such as a tag receptacle is configured as an indentation in the lid wall such that the tag may be positioned in the indentation and may not be removed merely by the force exerted by the retention element. Accordingly, since the tag is attached to the string, which is attached to the retention element, this position of the tag may reinforce the position of the retention element above the beverage if the size of the string does not permit the tag to be positioned in the indentation and the retention element to be positioned in the beverage at the same time. In other embodiments, an indentation is sized and shaped to receive parts of a string as well such that the position of the retention element above the beverage is reinforced. Further, a tag positioned in a tag receptacle may increase the ease with which the information on the tag—such as a trademark or other product information—may be viewed.

Embodiments of a lid wall may be shaped to permit easy stacking for cost effective shipping and storage. Other embodiments of a lid wall may be configured in a simplified construction such that the lids are easy to manufacture, clean, and reuse.

Embodiments of the universal lid system may be formed from materials such as ceramic, porcelain, metal, alloy, glass, crystal, plastic, or any other material suitable for retaining the temperatures developed within the teapot. A universal lid system made from such materials is useful for the service of beverages in restaurants, institutions, in the homes of consumers, or any other location where repeated use of the lid in connection with a teapot may be desired.

One advantage of the present invention is that a universal lid system is sized and shaped to facilitate quick and easy beverage preparation.

Another advantage of the present invention is that a universal lid system may be used with a retention element such as a tea bag to easily make a beverage.

Another advantage of the present invention is that a universal lid system may permit the storage of a retention element in an elevated storage element, which obviates the need to have a receptacle to place aside or dispose of or a retention element immediately after removal from water in teapot.

Another advantage of embodiments of the present invention is that the elevated storage element in a lid wall allows a consumer to store a greater volume of liquid in a teapot than if the retention element had to be stored in the teapot, yet not in contact with the water.

Another advantage of embodiments of the present invention is that an outlet space may be sized and shaped to minimize the amount of air exchanged between the teapot and outside of the teapot when the lid wall is in a closed position, therefore facilitating maintenance of a cool or warm environment inside of the teapot.

Another advantage of embodiments of the present invention is that the universal lid system may be used with teapots of a variety of sizes and shapes.

Another advantage of embodiments of the present invention is that lid walls may be easily stacked thereby reducing transportation costs and decreasing the need for costly storage space.

An additional advantage of the present invention is that its simplified construction is easy to manufacture, store, clean, and reuse.

It is, accordingly, a general object of the present invention to provide a universal lid system by which a beverage may be prepared from one or more retention elements quickly, easily, and sanitarily.

It is another object of this invention to provide a universal system lid which permits expulsion of excess liquid from retention element.

It is an additional object of this invention to provide a universal lid system which may be used in a variety of orientations and with teapots having a variety of shapes and sizes.

These and other aspects, features, and advantages of the present invention will become more readily apparent from the attached drawings and the detailed description of the preferred embodiments, which follow.

BRIEF DESCRIPTION OF THE DRAWINGS

FIG. 2A is a perspective view of another embodiment of a universal lid system;

FIG. 2B is a perspective view of the embodiment shown in FIG. 2A and additionally shows a retention element and a manipulation component;

FIG. 3A is a perspective view of another embodiment of a universal lid system and additionally includes retention elements and a manipulation components in a raised position;

FIG. 3B is a perspective view of the embodiment of the universal lid system of FIG. 3A and additionally includes retention elements and a manipulation components in a partial pull through position;

FIG. 4A is a perspective view of an additional embodiment of a universal lid system and includes a retention element and a manipulation component;

FIG. 4B and FIG. 4C are perspective views of the embodiment of FIG. 4A showing the manipulation component in different positions;

FIG. 5A perspective view of an additional embodiment of a universal lid system shown with a retention element and a manipulation component;

FIG. 5B is a perspective view of the embodiment shown in FIG. 5A and includes the universal lid system in a position to be received by a teapot;

FIG. 8A is a perspective view of an additional embodiment of a universal lid system and a protective element;

FIG. 8B is a perspective view of a universal lid system and a protective element positioned relative to the lid wall;

DETAILED DESCRIPTION OF EMBODIMENTS OF THE INVENTION

Figure 1:
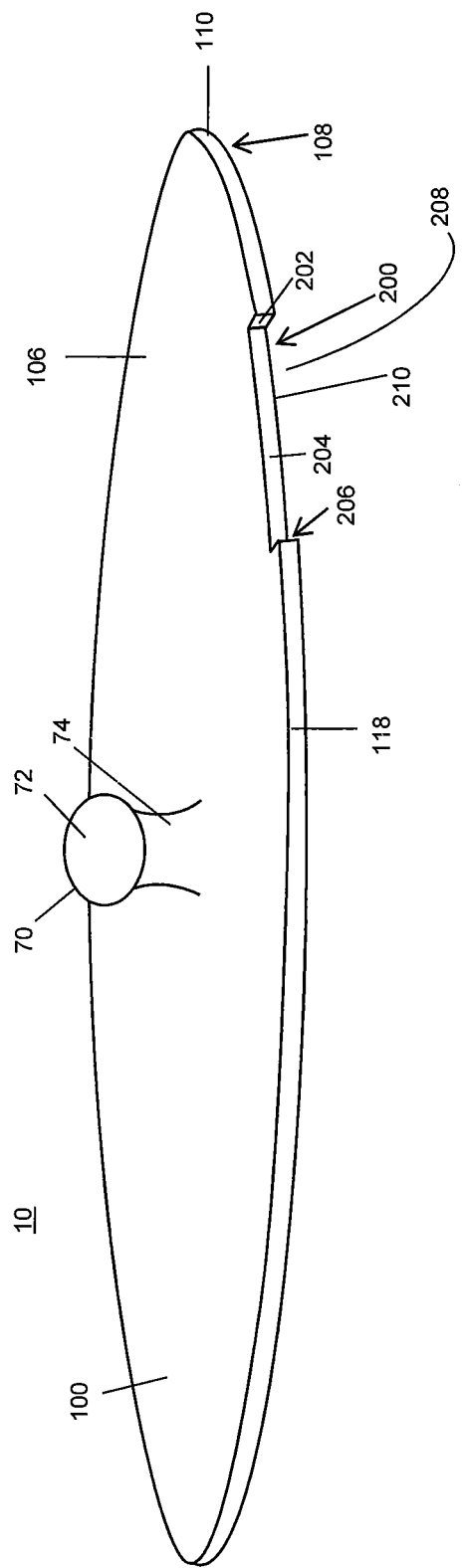
FIG. 1 is a perspective view of one embodiment of a universal lid system according to the present invention.

An embodiment of the universal lid system 10 according to the present invention is illustrated in FIG. 1. A universal lid system 10 includes a lid wall 100 having an upper lid wall 106, a lower lid wall 108, and a side lid wall 110. The lid wall 100 shown in FIG. 1 has a generally circular shape, although other shapes are contemplated. The embodiment of a lid wall 100 in FIG. 1 also includes a lid handle 70 having a knob 72 and a neck 74.

Embodiments of a lid wall 100 may include a wall outlet 200. The wall outlet 200 in FIG. 1 includes an outlet border 201 that define an outlet space 210. In the embodiment of a lid wall 100 illustrated in FIG. 1, the outlet borders 201 form part of the lid perimeter 118. The outlet border 201, which defines the wall outlet 200, includes a first outlet border 202, a second outlet border 204, a third outlet border 206, and an open border 208. In certain embodiments, the outlet borders 201 may be used as a surface against which a retention element 300 may be urged to expel any excess water stored within. A retention element 300 or manipulation component 350 may be positioned in or through the outlet space 210. Certain embodiments of a lid wall 100 include no opening to permit a beverage to be consumed through the lid wall 100, and a wall outlet 200 is configured not to permit a beverage to be consumed through the lid wall 100.

Figure 2C:
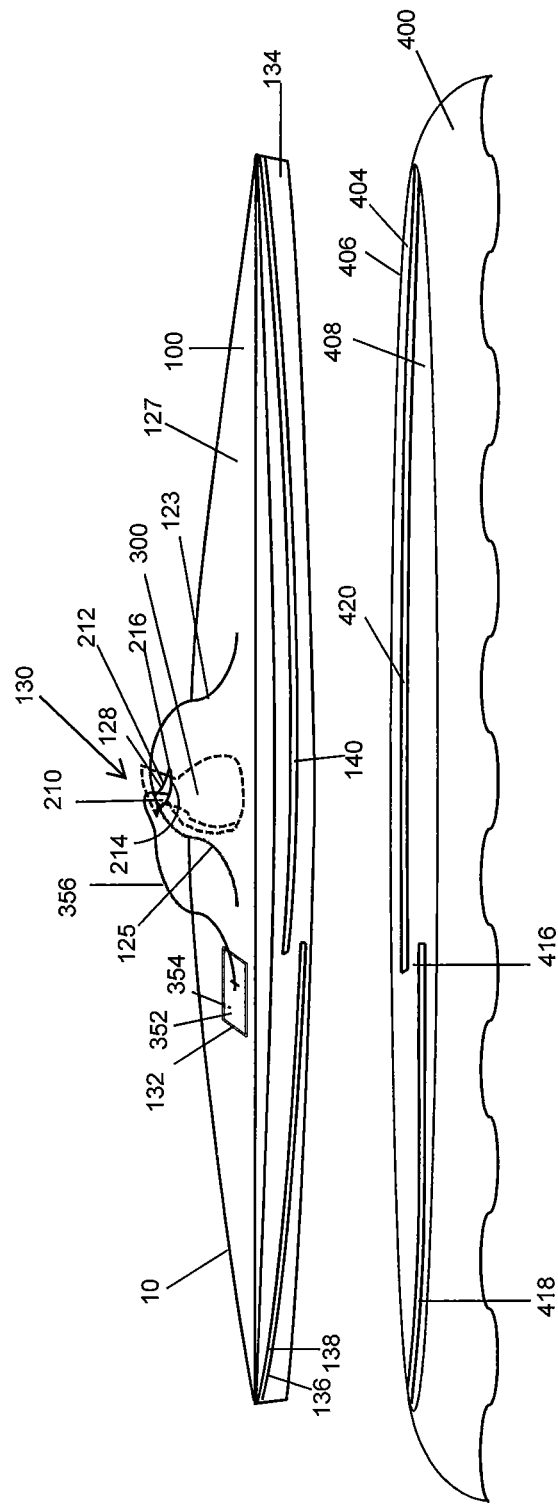
FIG. 2C is a perspective view of the embodiment shown in FIG. 2B and includes the universal lid system in a position to be received by one type of a teapot.

In certain embodiments, an outlet border 201 may include various borders having particular shapes such as an arced border, curved border, or a linear border. Certain embodiments of outlet borders 201 may be configured to achieve an outlet space 210 of a desired shape such as to minimize air passage through the space or to receive a retention element 300. Such an embodiment may include an outlet border 201 including a first arced border 212 and a second arced border 214 that meet at a first juncture 216 and a second juncture (not shown), as illustrated in FIG. 2A-FIG. 2C. This embodiment of an outlet border 201 forms a lune-shaped outlet space 128. A lune-shaped outlet space 128 has a generally minimized outlet space 210 such that less air may be exchanged through that space, therefore lessening the dissipation of the temperature developed in the teapot 400 while the lid wall 100 is in a closed position relative to the teapot 400.

Further, the lune-shaped outlet space 128 may be shaped to permit a manipulation component 350 such as a tag 352 to pass through the wall outlet 200 in an arc-aligned orientation. An "arc-aligned orientation" is an orientation in which the tag 352 is bent or flexed to complement the shape of the lune 128 such that the tag 352 may pass through the wall outlet 200. Typically, after passing through the lune-shaped outlet space 128, the pressure to bend or flex is released and the tag 352 returns to a non-bent or non-flexed orientation. The tag 352 in a non-bent orientation may achieve a generally flat orientation 354. In the embodiments in FIG. 2B and FIG. 2C, the retention element 300 is attached to the tag 352 by a string 356.

The lid wall 100 illustrated in FIG. 2A-FIG. 2C also includes a non-elevated section and an elevated storage element 122. The non-elevated section includes a generally horizontal linear surface 127. The elevated storage element 122 includes a first generally curved sloped surface 123 a second generally curved sloped surface 125. An elevated storage element 122 defines a storage space 124 in which a manipulation component 350 and/or a retention element 300 may be stored in a "raised position" 126. A "raised position" 126 is achieved when a retention element 300 is completely above the beverage in a teapot 400 when the lid wall 100 is in a closed position.

In certain embodiments, a portion of a retention element 300 may overflow through the wall outlet 200 to achieve a "partial pull through position" 131, as shown in FIG. 2C. In the "partial pull through position" 131, the retention element 300 effectively may plug or partially plug the wall outlet 200, which, advantageously, slows the process of the beverage reaching an ambient temperature when the lid wall 100 is in a closed position. In the "partial pull through position" 131, the retention element 300 typically is positioned completely above the beverage in a teapot 400 when the lid wall 100 is in a closed position.

Embodiments of a lid wall 100 may include a tag receptacle 132 or other type of receptacle in the lid wall 100. As shown in FIG. 2A, the tag receptacle 132 includes a side receptacle wall 135 and a lower receptacle wall 136. As shown in FIG. 2B and FIG. 2C, the tag 352 may be positioned in the tag receptacle 132. In this position, a tag 352 may reinforce the raised position of the retention element 300 and may increase the ease with which information that may be on the tag 352—such as a trademark or other product information—can be viewed.

Embodiments of the universal lid 10 also may include a closure component 134 attached to the lid wall 100, which may permit the lid wall 100 to meet with or releasably connect to a teapot 400. The closure component 134 illustrated in FIG. 2A-FIG. 2C includes a male threading 136 including a first thread 138 and a second thread 140. FIG. 2C also includes a teapot 400 and its complementary teapot closure component. The illustrated teapot 400 includes an inner surface 408 having a thread path 416 defined by a first teapot thread 418 and a second teapot thread 420. A first thread 138 can be threaded through a thread path 416 to releasably connect the lid wall 100 to a teapot 400. FIG. 2C additionally shows the teapot rim 406 defining a teapot opening 404.

Embodiments of a lid wall 100 may include more than one wall outlet 200 to permit one or more retention elements 300 to be positioned in a raised position 126, as shown in FIG. 3A and FIG. 3B. A first wall outlet 218 and a second wall outlet 220 may be positioned in an elevated storage element 122 defining a storage space 124. The outlet border 201 of each of the wall outlets 200 illustrated in FIG. 3A and FIG. 3B include only a curved border 152.

The retention elements 300 may be configured as packets 302 or holders 204, as shown in FIG. 3A and FIG. 3B respectively. Also, retention elements 300 may achieve a number of raised positions 126. FIG. 3A includes an illustration of the retention elements 300 in the storage space 124 in a "fully raised position" 130. A "fully raised position" 130 is achieved when a retention element 300 is positioned in the storage space 124 of the elevated storage element 122, and no part of a packet 302 is positioned above the lid wall 100. In addition, FIG. 3B includes an illustration of the retention elements 300 in a partial pull through position 131.

The embodiment illustrated in FIG. 3A and FIG. 3B additionally includes a closure component 134 configured as an oblique wall 148. A lid wall 100 including an oblique wall 148 may be positioned on teapots with various sized teapot rims 406 since the oblique wall 148 includes a sloped surface 149 that may meet a teapot rim 406 at a variety of diameters. In FIG. 3A and FIG. 3B, the oblique wall 148 includes a flat section 162 such that when the lid wall 100 is positioned on a teapot, the lid wall 100 may not cover the whole teapot opening 404. Accordingly, the space in front of the flat section 162 may function as an egress component and allow pouring of beverage.

As illustrated in FIG. 3A and FIG. 3B, embodiments of a lid wall may include a vent 121 to prevent a "vacuum" like conditions within a teapot 400 when beverage is being dispensed. Although other embodiments are shown without a vent 121, it is contemplated that any other embodiment may include a vent 121.

Embodiments of a lid wall 100 may be configured for use with certain designs of a retention element 300 or manipulation element 400. For example, the embodiment of a lid wall 100 illustrated in FIG. 4A-FIG. 4C includes outlet border 201 configured with three generally linear borders, which form an outlet space 210 that is generally triangular shaped 222. An embodiment of a lid wall 100 may be used with a manipulation component 350 having collapsible sides 364 and shaped as a tetrahedron 362. In this embodiment, the collapsible sides 364 may flex such that the tetrahedron 362 may pass through the outlet space 210 easily in its "collapsed" orientation 366. As illustrated in FIG. 4C, the collapsible sides 364 may flex back to its "uncollapsed" orientation 368 after passing through the wall outlet 200 such that the tetrahedron 362 may not pass through the wall outlet 200 easily. In such embodiments, a string 356 may attach the retention element 300 to the manipulation component 350 as shown in FIG. 4A-FIG. 4C.

FIG. 4A also includes an illustration of an embodiment including a closure component 134. In this embodiment, a closure component 134 includes a flange 154 such that a flange 154 may be positioned on a rim 406 or other element of a teapot 400.

Certain embodiments of a lid wall 100 include a wall outlet 200 having an outlet flank 230 made of a flexible material. An outlet flank 230 may be configured to allow retention elements 300 or manipulation components 350 of various sizes and shapes to pass through the outlet space 210, while minimizing the amount of ambient air exchanged through the space 210. The outlet flank 230 illustrated in FIG. 5A and FIG. 5B includes a first flank 232 and a second flank 234 connected to the outlet border 201. Outlet flanks 230 may also be configured to receive or retain a retention element 300 or manipulation component 350. As shown in FIG. 5A, a tag 352 and part of a string 356 may be thread through the outlet space 210 between the first flank 232 and second flank 234 to achieve a fully raised position 130. As shown in FIG. 5B, a retention element 300 may be thread partially through the outlet space 210 between a first flank 232 and second flank 234 to achieve a partial pull through position 131.

As illustrated in FIG. 5A and FIG. 5B, in certain embodiments, an entire lid wall 100 may form an elevated storage element 122. The elevated storage element 122 may be comprised of a first generally vertical surface 117 and a first generally horizontal surface 119.

The lid wall 100 further includes a closure component 134 with a slanted wall 156. FIG. 5B includes an illustration of the slanted wall 156 positioned on the rim 406 of a teapot 400. The teapot 400 additionally includes of a teapot handle 410 and a teapot spout 412. A teapot 400 also may include a teapot fill line 414 which may indicate the amount of liquid that the teapot 400 is configured to hold.

Figure 6A:
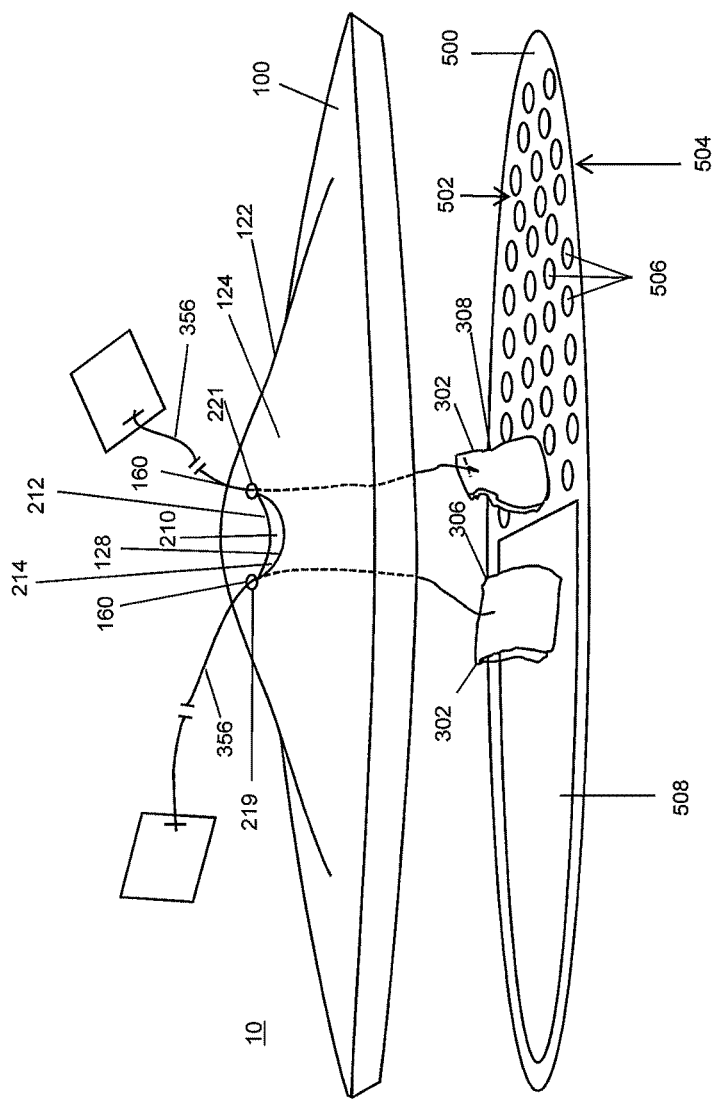
FIG. 6A is a perspective view of an additional embodiment of a universal lid system shown with retention elements, manipulation components, and a support member.
Figure 6B:
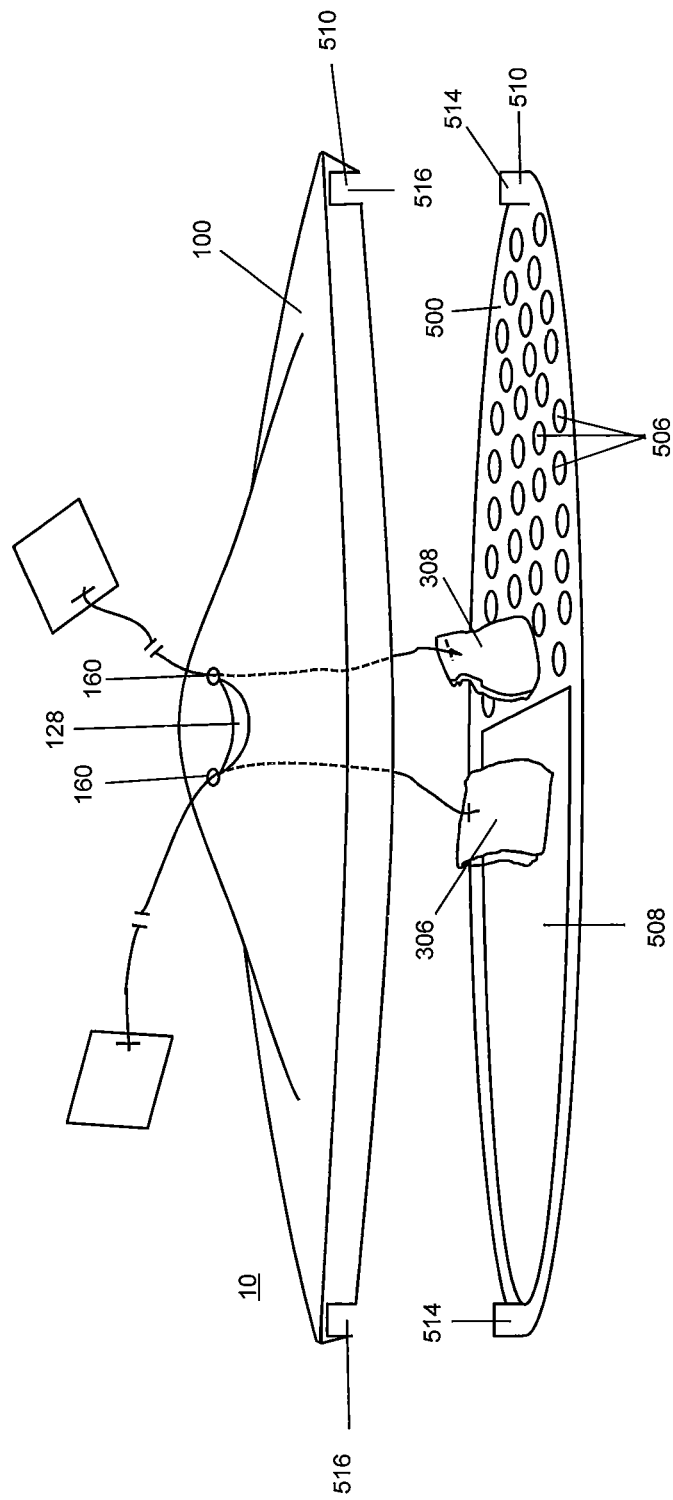
FIG. 6B is an exploded perspective view of an additional embodiment of a universal lid system shown with retention elements, manipulation components, and a support member.

Certain embodiments of a universal lid system 10 additionally include a support member, as shown in FIG. 6A and FIG. 6B. A support member 500 may include an upper support side 502 and a lower support side 504. A support member 500 may be positioned between the lid wall 100 and the rim 406 of a teapot 400. A support member 500 may be configured to support a retention element 300 on its upper support side 502. Embodiments of a support member 500 in FIG. 6A and FIG. 6B are configured with a perforated resting level 506 on which a retention element 300 may rest and an aperture 508 through which a retention element 300 may be raised, lowered, and otherwise moved around. In FIG. 6A, a first packet 306 is shown passing through an aperture 508. A second packet 308 is shown resting on the perforated resting level 506.

Also shown in FIG. 6A and FIG. 6B, a wall outlet 200 may be configured to be used with more than one retention element 300 at the same time. Such an embodiment may include an outlet border 201 including a first arced border 212, a second arced border 214, a first rounded border 219, and a second rounded border 221. The juncture between the first arced border 212 and the first rounded border 219 and the juncture between the second arced border 214 and the first rounded border 219 forms a narrow passageway through which the string 356 may be positioned. Similarly, the juncture between the first arced border 212 and the second rounded border 221 and the juncture between the second arced border 214 and the second rounded border 221 forms a narrow passageway through which a manipulation component 350 such as a string 356 may be positioned. A string 356 also may be positioned in the round outlet 160. In certain embodiments, a round outlet 160 may be sized and shaped to permit storage of a specific size string 356 such that upon entering the round outlet 160, the string 356 may be held in that position by tension.

The embodiment in FIG. 6B includes a support member 500 having support fastener components 510 such that a support member 500 may be removably fastened to a lid wall 100. In such an embodiment, the lid wall 100 additionally includes lid fastener components 510. Fastener components 510, 512 may be any mechanism through which a lid wall 100 and support member 500 may be removably fastened. In FIG. 6B, the support fastener components 510 are snap protrusions 514 and the lid fastener components 512 are snap inlets 516. A snap protrusion 514 may snap into a snap inlet 516.

Figure 7:
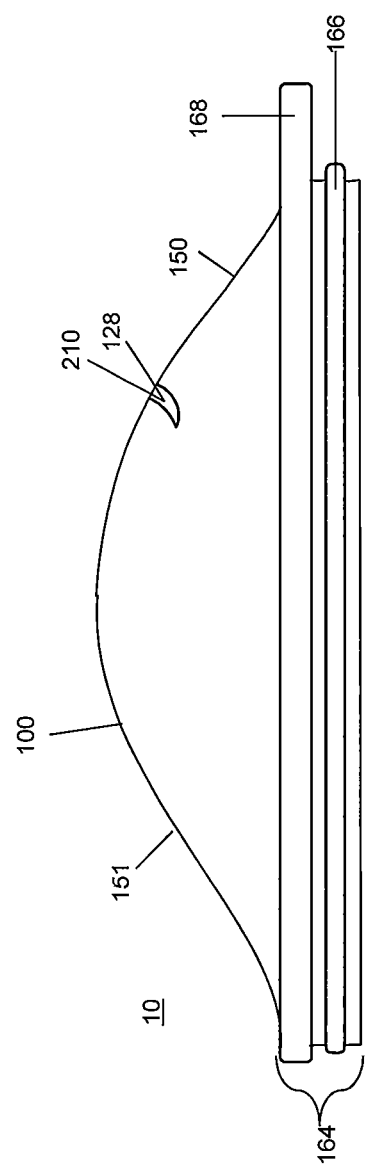
FIG. 7 is a perspective view of another embodiment of a universal lid system.

Embodiment of a universal lid system 10 may also include a protective element 164 configured to cover all or part of the closure component 134, as shown in FIG. 7. The protective element 164 may be a soft, spongy, or flexible material such that the protective element 164 protects the closure component 134 when it is positioned relative to a teapot rim 406 in a closed position. The protective element 164 may include a securing component 166 such that the protective element 164 may be removably secured to a teapot rim 406. The securing component 166 may be shaped as a first enlargement 141, as illustrated in FIG. 7. The protective element 164 also may include an extension 168. An extension 168 of the protective element 164 may further secure the lid wall 100 to a teapot 400 and provide leak protection for a finger or thumb which may be placed nearby during pouring. An extension 168 also may provide a surface which may be used to separate the lid wall 100 from a teapot rim 406.

Also, the embodiment of a lid wall 100 in FIG. 7 includes an elevated storage element 122. The elevated storage element 122 may be formed from a first gently curved sloped surface 150 and a second gently curved sloped surface 151.

Figure 8D:
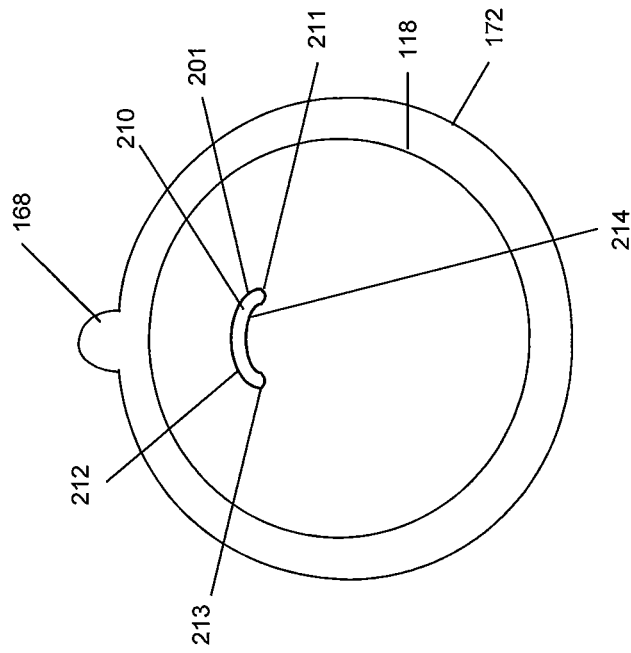
FIG. 8D is a top view of a universal lid system and a protective element positioned relative to the lid wall.
Figure 8C:
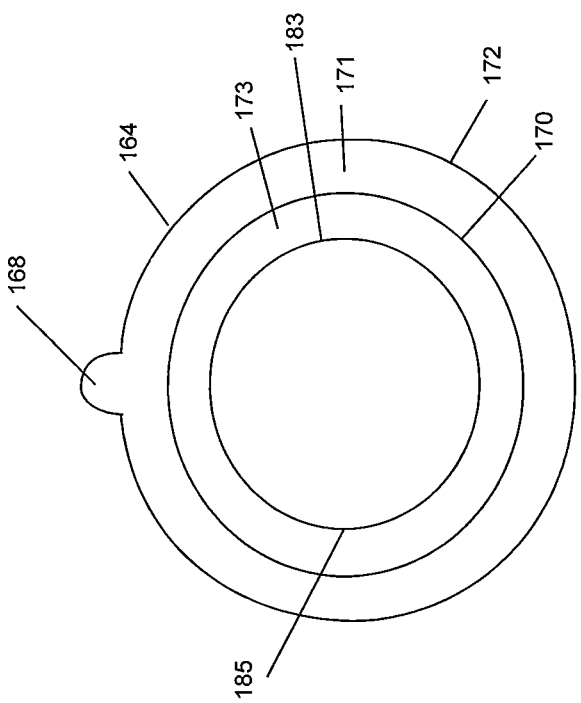
FIG. 8C is a top view of a protective element.

An embodiment of a lid wall 100 with a closure component 134 and a protective element 164 are shown in FIG. 8A and FIG. 8B. Embodiments of the protective element 164 may be sufficiently flexible to fit snugly with respect to the closure component 134 as shown in a side view in FIG. 8B and a top view in FIG. 8D. FIG. 8C includes an illustration of a top view of the protective element 164 without the lid wall 100.

As illustrated in FIG. 8A and FIG. 8B, the protective element 164 may include an outer perimeter 172, a first generally horizontal annular surface 171, a second generally horizontal annular surface 173, a first generally sloped annular surface 175, a first generally vertical annular surface 177, and a second generally vertical annular surface 179. The first generally horizontal annular surface 171 connects to the first generally sloped annular surface 175 along a first edge 170. The first generally sloped annular surface 175 connects to the second generally horizontal annular surface 173 along a second edge 181. The second generally horizontal annular surface 173 connects to the second generally vertical annular surface 179 along a third edge 183. The first generally vertical annular surface 177 defines the outer perimeter 172. The inner diameter 185 of the protective element 164 is defined by the third edge 183 in this embodiment.

The closure component 134 in the illustrated embodiment includes a closure wall having an outer closure wall 142 and an inner closure wall 144. The illustrated embodiment of the outside closure wall 142 includes a first enlargement 141, second enlargement 143, inter-enlargement wall 145, protuberance 146, and a relatively vertical closure wall 147. The first enlargement 141 may be continuous with the lid wall 100. The inter-enlargement wall 142 is positioned between the first enlargement 141 and the second enlargement 143. In this embodiment, the second enlargement 143 is positioned generally below the first enlargement 141. Each enlargement 141, 143 includes a section of the closure wall having a greater diameter than the rest of the closure wall.

In certain embodiments, the first edge 170 of protection element 164 may be sized and shaped to fit around the inter-enlargement wall 145 such that the protection element 164 may be securely positioned relative to the closure component 134. The inner diameter 185 of the protective element 164 may be flexible enough to be positioned around the protuberance 146 to achieve the snugly fit position as illustrated.

The protuberance 146 may be sized and shaped to facilitate maintaining the lid wall 100 in the desired position relative to a teapot rim 406. In certain embodiments, a protuberance 146 is sized and shaped to extend from a section in the closure wall, as shown. In other embodiments, multiple protuberances 146 may extend from the closure wall. When the lid wall 100 is in a closed position, the protuberance 146 is generally positioned below the teapot rim 406 and is configured to decrease the likelihood of the lid wall 100 separating from the teapot 400. In such embodiments, the consumer must tilt the lid wall 100 relative to the teapot rim 406 to remove the lid wall 100 from the teapot rim 406. Such a tilted position is unlikely to be achieved while the teapot 400 is oriented for pouring.

In the embodiment illustrated in FIG. 8A, FIG. 8B, and FIG. 8D, the outlet border 201 includes a first arced border 212, a second arced border 214, a third arced border 211, and a fourth arced border 213. The outlet space 210 forms a rounded arc shape.

It will be understood that the embodiments of the present invention, which have been described, are illustrative of some of the applications of the principles of the present invention. Numerous modifications may be made by those skilled in the art without departing from the true spirit and scope of the invention.

What is claimed is:

1. A universal lid system for preparing a beverage in a teapot, which has a teapot rim that defines a teapot opening, the beverage prepared using water and leaves introduced into the water in a retention element, wherein one end of a string is attached to the retention element and another end of the string is attached to a tag to form a string/tag arrangement configured to permit manipulation of the retention element such as raising and lowering of the retention element into or out of the water, said system comprising:
   a lid wall sized and shaped to meet with the teapot rim and including an upper lid wall, a lower lid wall, a side lid wall, and a lid perimeter, the upper lid wall further comprising a retention element stabilizing component for receiving the string of the retention element;
   a closure component connected to said side lid wall, wherein said closure component is configured to be releasably connected to the teapot rim;
   a support member comprising both a first portion including a plurality of perforations and a second portion including an aperture, the first portion for supporting the retention element on the plurality of perforations and the second portion for passing the retention element through the aperture, the support member positioned between the lid wall and the teapot rim;
   said retention element stabilizing component comprising a first arced border and a second arced border each joined by a first round border forming a round outlet for positioning of the string of the retention element, said retention element stabilizing component receives and stabilizes the string of the retention element such that the retention element may be moved to a position separated from contact with the beverage but releasably supported on the support member to permit service of the beverage.

2. The universal lid system of claim 1, wherein said retention element stabilizing component includes one or more wall surfaces forming an elevated storage element sized and shaped to permit storage of the retention element and hold the retention element above said lid perimeter.

3. The universal lid system of claim 1, wherein said retention element stabilizing component includes a receptacle such as a tag receptacle configured to receive the tag and releasably hold the retention element in a position separated from contact with the beverage.

4. The universal lid system of claim 1, wherein said retention element stabilizing component includes an opening such as a wall outlet, said wall outlet including an outlet border that defines an outlet space.

5. The universal lid system of claim 4, wherein the outlet border includes at least one of an arced border, a curved border, and a linear border.

6. The universal lid system of claim 5, wherein said outlet border is configured to achieve said outlet space in a rounded arc shape.

7. The universal lid system of claim 4, wherein said wall outlet further includes one or more outlet flanks configured to receive and releasably hold the retention element in a position separated from contact with the beverage.

8. The universal lid system of claim 1, wherein said retention element stabilizing component includes a first wall outlet and a second wall outlet, said first wall outlet and said second wall outlet positioned to permit stabilization of more than one retention element such that more than one retention element may be releasably held in a position separated from contact with the beverage.

9. The universal lid system of claim 1, wherein said closure component includes a closure wall configured to include a first enlargement, a second enlargement, an inter-enlargement wall, a protuberance, and a relatively vertical closure wall.

10. The universal lid system of claim 1, further comprised of a protective element configured to cover at least a portion of said closure component designed to meet with the teapot rim such that, when said lid wall is in a closed positioned relative to the teapot rim, said closure component does not directly contact the teapot rim since said protective element is positioned between said closure component and the teapot rim.

11. The universal lid system of claim 10, wherein said protective element includes an extension configured to provide a surface which may be used to separate said lid wall from the teapot rim and provide leak protection for a finger or thumb which may be placed nearby during pouring.

12. The universal lid system of claim 10, wherein said protective element includes a first generally horizontal annular surface, a second generally horizontal annular surface, a first generally sloped annular surface, a first generally vertical annular surface, and a second generally vertical annular surface, wherein said first generally horizontal annular surface connects to said first generally sloped annular surface along a first edge, said first generally sloped annular surface connects to said second generally horizontal annular surface along a second edge, said second generally horizontal annular surface connects to said second generally vertical annular surface along a third edge, said first generally vertical annular surface defines an outer perimeter, and said third edge defines an inner diameter.

13. The universal lid system of claim 1, wherein the first portion is completely planar with the second portion.

14. The universal lid system of claim 1, wherein the support member further comprises a third portion including one or more support fastener components for securing together the lid wall and the support member.

15. A universal lid system for preparing a beverage in a teapot, which has a teapot rim that defines a teapot opening, the beverage prepared using water and leaves, said system comprising:

a retention element having an inner volume sized and shaped for enclosure of the leaves and having sufficient porosity such that the water can flow readily in and out of said inner volume;

a manipulation element connected to the retention element such that a user may manipulate position of the retention element using said manipulation element;

a lid wall including an upper lid wall, a lower lid wall, a side lid wall, and a closure component;

said closure component including a lid threading sized and shaped to be received in a thread path positioned on an inner wall of the teapot adjacent to the teapot rim such that said lid wall is releasably connectible to the teapot;

a support member positioned between the lid wall and the teapot rim, the support member including an upper support side and a lower support side, the support member comprising both a perforated resting level on which the retention element sits and an aperture through which the retention element passes into the inner volume, the perforated resting level planar with the aperture;

said upper lid wall of said lid wall including a wall outlet for positioning of the manipulation element of the retention element, wherein the wall outlet comprises a first arced border and a second arced border each joined by a first round border, the wall outlet sized and shaped to receive and stabilize the manipulation element of the retention element such that said retention element may be moved to a position supported by the upper support side of the support member such that said retention element is separated from contact with the beverage to permit service of the beverage.

16. The universal lid system of claim 15, further comprising a retention element stabilizing component including an opening such as a wall outlet, said wall outlet including an outlet border that defines an outlet space.

17. The universal lid system of claim 16, wherein said manipulation element is configured as a tag/string arrangement including a tag and a string having a first end and a second end, said first end of said string connected to said tag and said second end of said string connected to said retention element, wherein said tag is configurable to achieve a reduced profile to fit through said outlet space and to achieve an expanded profile to reduce ease with which the tag may pass back through said outlet space.

18. The universal lid system of claim 15, wherein said manipulation element is configured as a tag/string arrangement including a tag and a string having a first end and a second end, said first end of said string connected to said tag and said second end of said string connected to said retention element and a retention element stabilizing component including a receptacle configured to receive said tag and therefore releasably hold said retention element in a position separated from contact with the beverage.

19. The universal lid system of claim 15, wherein the support member further comprises one or more snap protrusions for securing together the lid wall and the support member.

* * * * *